United States Patent
Frank

(10) Patent No.: US 11,601,895 B2
(45) Date of Patent: Mar. 7, 2023

(54) METHOD AND APPARATUS FOR DETERMINING SECONDARY CELL GROUP ADDITIONAL MAXIMUM POWER REDUCTION AND CONFIGURED MAXIMUM POWER

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 337 days.

(21) Appl. No.: 16/798,321

(22) Filed: Feb. 22, 2020

(65) Prior Publication Data
US 2020/0275388 A1    Aug. 27, 2020

Related U.S. Application Data

(60) Provisional application No. 62/809,513, filed on Feb. 22, 2019.

(51) Int. Cl.
*H04W 4/00* (2018.01)
*H04W 52/36* (2009.01)
(Continued)

(52) U.S. Cl.
CPC ......... *H04W 52/36* (2013.01); *H04W 52/146* (2013.01); *H04W 72/0473* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2018/0279230 A1* | 9/2018 | Yi | H04W 72/0473 |
| 2018/0279339 A1* | 9/2018 | Löhr | H04W 52/34 |

OTHER PUBLICATIONS

PCT International Search Report for PCT/IB2020/051502, Lenovo (Singapore) Pte. Ltd., dated May 20, 2020.
(Continued)

*Primary Examiner* — Zewdu A Beyen
(74) *Attorney, Agent, or Firm* — Loppnow & Chapa

(57) ABSTRACT

A method and apparatus provides for receiving an indication of an uplink resource allocation of resource blocks for a transmission on a master cell group. An indication is received of an uplink resource allocation of resource blocks for a transmission on a secondary cell group. A total additional maximum power reduction is determined based on the indication of the uplink resource allocation of the resource blocks for the transmission on the master cell group and the indication of the uplink resource allocation of the resource blocks for the transmission on the secondary cell group. A remaining power is determined for the secondary cell group by reducing a signaled maximum dual-carrier power by the total additional maximum power reduction and subtracting a configured master cell group power. A secondary cell group additional maximum power reduction is determined as the difference between a signaled maximum secondary cell group power and the remaining power for the secondary cell group. A configured maximum power is determined for the secondary cell group based on the determined secondary cell group additional maximum power reduction.

18 Claims, 3 Drawing Sheets

(51) Int. Cl.
    *H04W 52/14*     (2009.01)
    *H04W 72/044*     (2023.01)
    *H04W 88/06*     (2009.01)

(56) References Cited

OTHER PUBLICATIONS

Qualcomm Incorporated, "Completion of configured maximum output power for intra-band contiguous EN-DC", RP-182615, for 3GPP TSG-RAN #82, Sorrento, Italy, Dec. 10-13, 2018.

Qualcomm Incorporated, "Pcmax for intra-band EN-DC", R4-1812407, for3GPP TSG-RAN WG4 #88bis, Chengdu, China, Oct. 8-12, 2018.

Motorola Mobility, "On the SCG MPR/A-MPR and Pcmax for EN-DC with Dynamic Power Sharing", R4-1904676, for 3GPP TSG RAN WG4 #90bis, Xi'an, China, Apr. 8-12, 2019.

3GPP TS 38.101-1 V15.4.0 (Dec. 2018), 3rd Generation Partnership Project; Technical Specification Group Radio Access Network; NR; User Equipment (UE) radio transmission and reception; Part 1: Range 1 Standalone (Release 15), 223 pages.

3GPP TS 38.101-3 V15.4.0 (Dec. 2018), 3rd Generation Partnership Project; Technical Specification Group Radio Access Network; NR; User Equipment (UE) radio transmission and reception; Part 3: Range 1 and Range 2 Interworking operation with other radios (Release 15), 188 pages.

3GPP TS 38.213 V15.4.0 (Dec. 2018), 3rd Generation Partnership Project; Technical Specification Group Radio Access Network; NR; Physical layer procedures for control (Release 15), 104 pages.

3GPP TS 36.101 V15.5.0 (Dec. 2018), 3rd Generation Partnership Project; Technical Specification Group Radio Access Network; Evolved Universal Terrestrial Radio Access (E-UTRA); User Equipment (UE) radio transmission and reception (Release 15), 1806 pages.

\* cited by examiner

METHOD AND APPARATUS FOR DETERMINING SECONDARY CELL GROUP ADDITIONAL MAXIMUM POWER REDUCTION AND CONFIGURED MAXIMUM POWER

FIELD OF THE INVENTION

The present disclosure is directed to a method and apparatus for determining secondary cell group (SCG) additional maximum power reduction (A-MPR) and configured maximum power (Pcmax), including an SCG A-MPR and a Pcmax for dual connectivity with dynamic power sharing and master cell group (MCG) prioritization.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least a couple of bandwidth extending techniques include the use of carrier aggregation, dual carrier, and/or dual connectivity, where multiple frequency bands from one or more networks are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of a build out of a network that incorporates the initial adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

In at least some instances, the network infrastructure supporting each of the standards may be alternatively referred to as a cell group. In some of these instances, one cell group may be prioritized over the other cell group. In such an instance, the prioritized cell group may be referred to as a master cell group and a non-prioritized cell group may be referred to as a secondary cell group.

In instances, where there are multiple connections, where in some instance the separate connections may involve a connection with a different network infrastructure, managing the overall operation of the communication connections in a particular user equipment relative to the potentially multiple networks can present a challenge, as some of the decisions may need to made in an environment where each of the actors may have less than complete information.

The present inventor has recognized that where existing specifications may provide that a secondary cell group knows the resource block allocation for the master cell group in order for the secondary cell group to compute an additional maximum power reduction, that it may be reasonable for the secondary cell group to be expected to also know the configured power for the master cell group, which in turn may allow the knowledge of the configured power for the master cell group to then be used as part of computing an additional maximum power reduction for the secondary cell group.

SUMMARY

The present application provides a method in a user equipment. The method includes receiving an indication of an uplink resource allocation of resource blocks for a transmission on a master cell group. An indication is received of an uplink resource allocation of resource blocks for a transmission on a secondary cell group. A total additional maximum power reduction is determined based on the indication of the uplink resource allocation of the resource blocks for the transmission on the master cell group and the indication of the uplink resource allocation of the resource blocks for the transmission on the secondary cell group. A remaining power is determined for the secondary cell group by reducing a signaled maximum dual-carrier power by the total additional maximum power reduction and subtracting a configured master cell group power. A secondary cell group additional maximum power reduction is determined as the difference between a signaled maximum secondary cell group power and the remaining power for the secondary cell group. A configured maximum power is determined for the secondary cell group based on the determined secondary cell group additional maximum power reduction.

According to another possible embodiment, a user equipment in a communication network is provided. The user equipment includes a transceiver that receives an indication of an uplink resource allocation of resource blocks for a transmission on a master cell group, and receives an indication of an uplink resource allocation of resource blocks for a transmission on a secondary cell group. The user equipment further includes a controller, coupled to the transceiver, that determines a total additional maximum power reduction based on the indication of the uplink resource allocation of the resource blocks for the transmission on the master cell group and the indication of the uplink resource allocation of the resource blocks for the transmission on the secondary cell group. The controller additionally determines a remaining power for the secondary cell group by reducing a signaled maximum dual-carrier power by the total additional maximum power reduction and subtracting a configured master cell group power. The controller additionally determines a secondary cell group additional maximum power reduction as the difference between a signaled maximum secondary cell group power and the remaining power for the secondary cell group. The controller additionally determines a configured maximum power for the secondary cell group based on the determined secondary cell group additional maximum power reduction.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
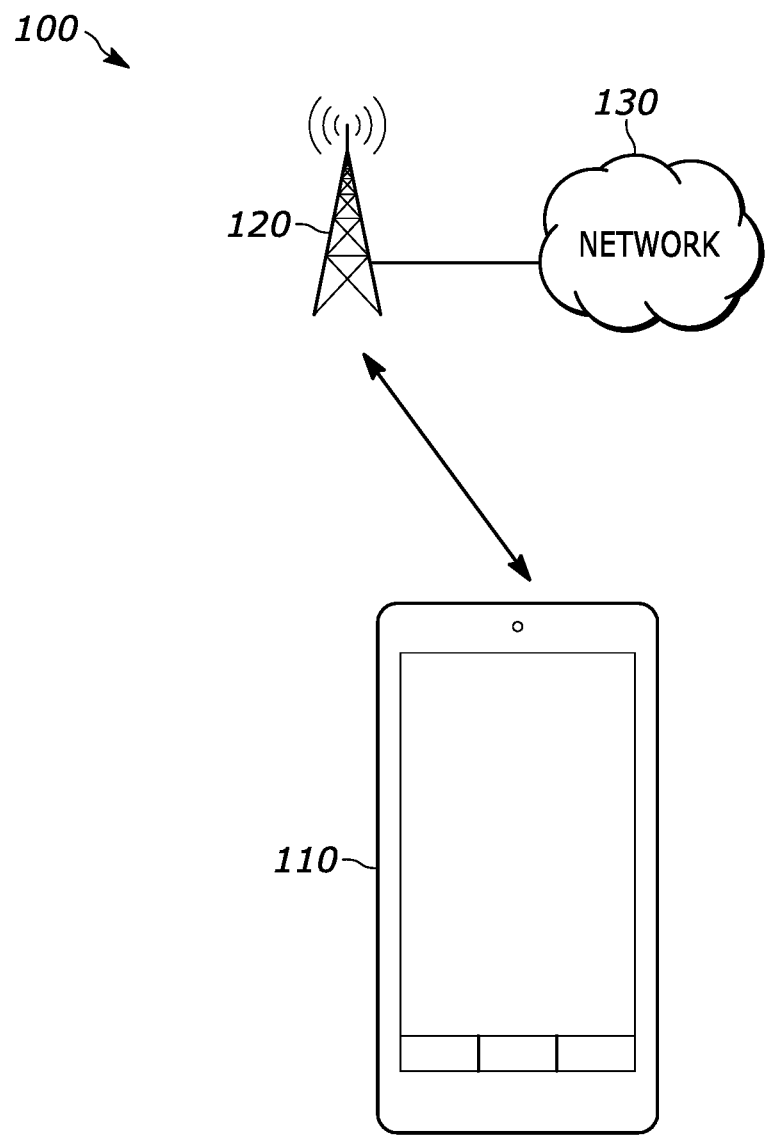
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for determining secondary cell group (SCG) additional maximum power reduction (A-MPR) and configured maximum power (Pcmax), including an SCG A-MPR and a Pcmax for dual connectivity with dynamic power sharing and master cell group (MCG) prioritization.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

At least some existing systems allow the SCG to be dropped when it may not be necessary to do so. Also, at least some existing systems may not correctly implement the radio layer 1 (RAN1) agreement.

In accordance with at least some embodiments of the present disclosure, the A-MPR for the SCG can more explicitly depend on the configured transmit power for the MCG rather than the maximum configured transmit power.

As a result, the SCG may not be unnecessarily dropped and the RAN1 agreements in TS 38.213 may be better reflected.

As such, the A-MPR and Pcmax for the SCG would be better defined, such as in cases with evolved universal terrestrial radio access (E-UTRA) new radio (NR) dual connectivity (EN-DC) in a manner that can reduce the dropping and scaling of the SCG.

According to a possible embodiment of the present disclosure, the present disclosure addresses how to allocate power between two carriers for dual carrier transmission when one of the carriers is prioritized over the other, for example when a first carrier is identified as the master cell group (MCG) and the second carrier is identified as the secondary cell group (SCG). In one embodiment, the MCG is an LTE carrier and the SCG is an NR carrier. In another embodiment, the MCG is an NR carrier and the SCG is an LTE carrier. In another embodiment, both the MCG and the SCG are NR carriers.

From TS 38.213, we have the following:

if $\hat{P}_{MCG}(i_1)+\hat{P}_{SCG}(i_2)>\hat{P}_{Total}^{EN\text{-}DC}$ in any portion of slot $i_2$ of the SCG, the UE reduces transmission power in any portion of slot $i_2$ of the SCG so that $\hat{P}_{MCG}(i_1)+\hat{P}_{SCG}(i_2) \leq \hat{P}_{Total}^{EN\text{-}DC}$ in any portion of slot $i_2$, where $\hat{P}_{MCG}(i_1)$ and $\hat{P}_{SCG}(i_2)$ are the linear values of the total UE transmission powers in subframe $i_1$ of the MCG and in slot $i_2$ of the SCG in FR1, respectively. The UE is not required to transmit in any portion of slot $i_2$ of the SCG if $\hat{P}_{SCG}(i_2)$ would need to be reduced by more than the value provided by $X_{SCALE}$ in order for $\hat{P}_{MCG}(i_1)+\hat{P}_{SCG}(i_2) \leq \hat{P}_{Total}^{EN\text{-}DC}$ in any portion of slot $i_2$ of the SCG. The UE is required to transmit in slot $i_2$ of the SCG if $\hat{P}_{SCG}(i_2)$ would not need to be reduced by more than the value provided by $X_{SCALE}$ in order for $\hat{P}_{MCG}(i_1)+\hat{P}_{SCG}(i_2) \leq \hat{P}_{Total}^{EN\text{-}DC}$ in all portions of slot $i_2$.

However, there are several fundamental concerns with the text in the specification. The first concern is that in the case that $\hat{P}_{SCG}(i_2)$ is scaled or dropped, then $\hat{P}_{SCG}(i_2)$ is actually the power that would have been transmitted without dropping or scaling—it is not the actual transmission power for the SCG. However, it is not clear if $\hat{P}_{SCG}(i_2)$ is
  i) the power that would have been transmitted if there was no MCG at all, or
  ii) the power that would have been transmitted if the MCG was present but not prioritized.

Furthermore, as $\hat{P}_{SCG}(i_2)$ must be less than the configured Pcmax for the SCG and the maximum configured power (Pcmax) is a function of the additional maximum power reduction (A-MPR), the SCG A-MPR should be specified before it can be determined if the SCG should be dropped. It is not clear what A-MPR should be applied for the SCG given that the RAN1 specification does not indicate which A-MPR should be applied (nor does it say anything about A-MPR).

The A-MPR to be applied for the MCG with MCG prioritization is clear and is specified in 38.101-3—it is the A-MPR that applies for the MCG in the absence of the SCG. This A-MPR depends on the MCG resource block (RB) allocation and is independent of the SCG RB allocation. Thus, if the MCG is an LTE carrier, then the A-MPR that is applied is the A-MPR that is specified in TS 36.101. Conversely, if the MCG is an NR carrier in frequency range 1 (FR1), the A-MPR that is applied is the A-MPR that is specified in TS 38.101-1.

Conversely, for the SCG, the A-MPR that should be applied is not clearly specified. The present inventor has recognized that there are multiple possibilities as is described below.

Option 1: The stand-alone SCG A-MPR that applies and which depends only on the SCG RB allocation.

Option 2: The EN-DC A-MPR that applies to the SCG with dynamic power sharing but without LTE prioritization. This A-MPR depends on both the MCG and the SCG resource block (RB) allocation. This A-MPR is defined in 38.101-3 for DC_(n)41 but is not specifically defined for DC_(n)71. For DC_(n)41, the per-carrier A-MPR is defined independently of the number of RBs on each carrier, but does depend on the total number of RBs. For DC_(n)71, the total A-MPR is defined as a function of the total allocation ratio which is defined as the total number of allocated RBs over both carriers over sum of the maximum number of RBs for the configured carriers. This can be converted to a per-carrier A-MPR by using the ratio of the number of allocated RBs for each carrier to the total number of allocated RBs, but this is currently not done in the 38.101-3 specification.

Option 3: The EN-DC A-MPR that should be applied to the SCG to better ensure that the emissions requirements are met even when the MCG is transmitting at the configured maximum power consistent with the A-MPR in the MCG stand-alone specification. With this A-MPR definition, it should not be necessary to scale the SCG, as $\hat{P}_{SCG}(i_2)$ should meet emissions requirements. However with this definition, Pcmax for the SCG will often be 0 in linear terms—that is, no power can be transmitted on the SCG. With this definition, it can be shown for DC_n(71) that the SCG could be dropped whenever there is a transmission on the MCG.

Option 4: The EN-DC A-MPR that should be applied to the SCG to ensure that the emissions requirements are met while taking into account the actual value of $\hat{P}_{MCG}(i_1)$ and interpreting the difference between Pcmax for the MCG and $\hat{P}_{MCG}(i_1)$ as the A-MPR that has been applied to the MCG. With this approach, it should never be necessary to scale the SCG as $\hat{P}_{SCG}(i_2)$ should be sufficient to meet emissions requirements. With this approach, the UE computes the remaining power for the SCG as the difference between the maximum power that can be transmitted over both carriers using the dual-carrier A-MPR and the power that is transmitted on the MCG. The A-MPR for the SCG is then defined as the difference between the signalled maximum secondary cell group power and the remaining power.

For the above possibilities, the following observations are noted:

i) Option 1 more frequently allows scaling and dropping of the four options. Option 2 allows scaling and dropping the second most frequently of the four options.

ii) Options 3 and 4 do not allow scaling, but do allow dropping in the case that Pcmax for the SCG is 0 in linear scale so that there is no remaining power.

iii) Of all of the options, Option 4 allows the SCG to transmit more frequently and with the more power A few additional issues to consider are, as follows. In the past, Pcmax for the SCG has typically not depended on the actual configure power $\hat{P}_{MCG}(i_1)$ for the MCG. However, since the existing specification requires that the SCG know the RB allocation for the MCG in order for the SCG to compute A-MPR, it would not be unreasonable to expect that is also feasible for the SCG to know the actual configured power for the MCG so that this can also be used when computing A-MPR for the SCG.

It might be suggested that the base station (eNB or gNB) for the SCG may not be able to predict the A-MPR used by the UE. However, this is an already existing concern, since the existing A-MPR already depends on the RB allocation for the MCG and this may be unknown to the base station for the SCG. So, the base station scheduler for the SCG should already be able to cope with being unable to predict the A-MPR for the SCG. Furthermore, this is typically only a concern when the transmit power for the SCG is bumping up against the configured maximum power Pcmax. There is believed to be no issue at lower power levels.

It can be observed from the TS 38.213 text that there is a concern over excessive scaling of the SCG transmission. At least one reason to limit scaling for intra-band EN-DC is due to the concern over the in-phase and quadrature (IQ) image which can desense the weaker carrier. For example, if the IQ image specification for the UE transmitter is 28 dB and the power spectral density imbalance is 10 dB, the peak signal to noise ratio (SNR) for the weaker carrier is 18 dB (=28-10). Another possible concern may relate to the ability of the UE to accurately set power levels. With options 3 and 4, there is no explicit scaling. One possible way to address this concern would be to transmit the SCG only when the power spectral density imbalance between the MCG and the SCG is within a limit of a predefined X dB, where the limit could either be fixed or semi-statically signalled. When the power spectral density (PSD) imbalance between the two carriers would be greater than X dB, the UE would be allowed to drop the SCG. Alternatively, since in at least some instances, an objective of prioritizing the MCG can be to protect the MCG transmission, the SCG transmission may only be dropped or scaled when the power spectral density of the SCG transmission would be X dB greater than the spectral density of the MCG transmission. Again, the threshold value X can be set in the specification or semi-statically signalled.

As such, the existing RAN1 specification may be less than clear as to when scaling and dropping may be allowed, which could depend on how A-MPR is computed for the SCG. Four options for computing A-MPR have been discussed above. Of these options, Option 4 is believed to better maximize the power available for transmission on the SCG. Option 4 can be combined with a limit on the PSD imbalance to address power scaling concerns.

In accordance with some embodiments, the changes can include

1) Modifications to the Pcmax equations in 38.101-3 for intra-band (and possibly inter-band) EN-DC to reflect Option 4
2) Adding a limit to the PSD imbalance between the carriers for intra-band EN-DC only which is possibly signaled.

Some examples of how the A-MPR for the SCG could be modified in 38.101-3 for the case of dynamic power sharing are shown below.

Example 1

6.2B.3.1.1 A-MPR for DC_(n) 71AA

For UE supporting dynamic power sharing the following:
for the MCG, A-MPR$_c$ in accordance with 3GPP TS 36.101: "Evolved Universal Terrestrial Radio Access (E-UTRA); User Equipment (UE) radio transmission and reception"
for the SCG, If $P_{MCG} < P_{PowerClass,EN-DC} - \text{A-MPR}_{DC}$, then A-MPR$'_c = P_{PowerClass,NR} - 10*\log_{10}(10^{\wedge}((P_{PowerClass,EN-DC} - \text{A-MPR}_{DC})/10) - 10^{\wedge}(P_{MCG}/10))$ else A-MPR'$_c$=infinite, and the SCG may be dropped where $P_{MCG}$ is the configured output power for the MCG. Furthermore, if the configured power for the MCG and the SCG is such that the power spectral density of the SCG is more than X dB greater than the PSD of the MCG, then the SCG transmission may be dropped. Alternatively, if the power spectral density of the SCG is more than X dB greater than the power spectral density of the MCG, then the power of the SCG may be reduced until the power spectral density of the SCG is X dB greater than the power spectral density of the MCG.

Example 2

6.2B.3.1.2 A-MPR for NS_04
6.2B.3.1.2.0 General
When the UE is configured for B41/n41 intra-band contiguous EN-DC and it receives IE NS_04, the UE determines the total allowed maximum output power reduction as specified in this subclause. The A-MPR for EN-DC defined in this section is used instead of MPR defined in 6.2B.2.2, not additively, so EN-DC MPR=0 when NS_04 is signalled.
For UE supporting dynamic power sharing the following:
    for the MCG, A-MPR, in accordance with 3GPP TS 36.101: "Evolved Universal Terrestrial Radio Access (E-UTRA); User Equipment (UE) radio transmission and reception"
    for the SCG,
If $P_{MCG} < P_{PowerClass,EN-DC} - \text{A-MPR}_{tot}$,
then
    A-MPR'$_c$=$P_{PowerClass,NR}$−10*log$_{10}$(10^
    (($P_{PowerClass,EN-DC}$−A-MPR$_{tot}$)/10)−10^($P_{MCG}$/10))
else
    A-MPR'$_c$=infinite, and the SCG may be dropped
where $P_{MCG}$ is the configured output power for the MCG
and
A-MPR$_{tot}$=$P_{PowerClass,EN-DC}$−min($P_{PowerClass,EN-DC}$, 10*log$_{10}$(10^(($P_{PowerClass,E-UTRA}$−A-MPR$_{E-UTR}$)/10)+10^ (($P_{PowerClass,NR}$−A-MPR$_{NR}$)/10))
    where
        A-MPR$_{E-UTRA}$=MAX(A-MPR$_{single,E-UTRA}$+MPR$_{single,E-UTRA}$, A-MPR$_{IM3}$)
    with
        A-MPR$_{single,\ E-UTRA}$ is the A-MPR defined for the E-UTRA transmission in 3GPP TS 36.101: "Evolved Universal Terrestrial Radio Access (E-UTRA); User Equipment (UE) radio transmission and reception"
        A-MPR$_{single,NR}$ is the A-MPR defined for the NR transmission in 3GPP TS 38.101-1: "NR; User Equipment (UE) radio transmission and reception; Part 1: Range 1 Standalone"
        MPR$_{single,E-UTRA}$ is the MPR defined for the E-UTRA transmission in 3GPP TS 36.101: "Evolved Universal Terrestrial Radio Access (E-UTRA); User Equipment (UE) radio transmission and reception"
Furthermore, if the configured power for the MCG and the SCG is such that the power spectral density of the SCG is more than X dB greater than the PSD of the MCG, then the SCG transmission may be dropped. Alternatively, if the power spectral density of the SCG is more than X dB greater than the power spectral density of the MCG, then the power of the SCG may be reduced until the power spectral density of the SCG is X dB greater than the power spectral density of the MCG.

Example 3

6.2B.3.2.1 A-MPR for NS_04
When the UE is configured for B41/n41 intra-band non-contiguous EN-DC and it receives IE NS_04, the UE determines the total allowed maximum output power reduction as specified in this subclause. The A-MPR for EN-DC defined in this section is used instead of MPR defined in 6.2B.2.2, not additively, so EN-DC MPR=0 when NS_04 is signaled.
For UE supporting dynamic power sharing the following:
    for the MCG, A-MPR$_c$ in accordance with 3GPP TS 36.101: "Evolved Universal Terrestrial Radio Access (E-UTRA); User Equipment (UE) radio transmission and reception"
    for the SCG,
If $P_{MCG} < P_{PowerClass,EN-DC} - \text{A-MPR}_{tot}$,
then
    A-MPR'$_c$=$P_{PowerClass,NR}$−10*log$_{10}$(10^
    (($P_{PowerClass,EN-DC}$−A-MPR$_{tot}$)/10)−10^($P_{MCG}$/10))
else
    A-MPR'$_c$=infinite, and the SCG may be dropped
where $P_{MCG}$ is the configured output power for the MCG
and
    for the total configured transmission power,
A-MPR$_{tot}$=$P_{PowerClass,EN-DC}$−min($P_{PowerClass,EN-DC}$, 10*log$_{10}$(10^(($P_{PowerClass,E-UTRA}$−A-MPR$_{E-UTRA}$)/10)+ 10^A(($P_{PowerClass,NR}$−A-MPR$_{NR}$)/10))
    where
        A-MPR$_{E-UTRA}$=MAX(A-MPR$_{single,E-UTRA}$+MPR$_{single,E-UTRA}$, A-MPR$_{EN-DC}$)
        A-MPR$_{EN-DC}$=MAX(A-MPR$_{IM3}$, A-MPR$_{ACLRoverlap}$)
    with
        A-MPR$_{single,\ E-UTRA}$ is the A-MPR defined for the E-UTRA transmission in 3GPP TS 36.101: "Evolved Universal Terrestrial Radio Access (E-UTRA); User Equipment (UE) radio transmission and reception"
        A-MPR$_{single,NR}$ is the A-MPR defined for the NR transmission in 3GPP TS 38.101-1: "NR; User Equipment (UE) radio transmission and reception; Part 1: Range 1 Standalone"
        MPR$_{single,E-UTRA}$ is the MPR defined for the E-UTRA transmission in 3GPP TS 36.101: "Evolved Universal Terrestrial Radio Access (E-UTRA); User Equipment (UE) radio transmission and reception"

Figure 2:
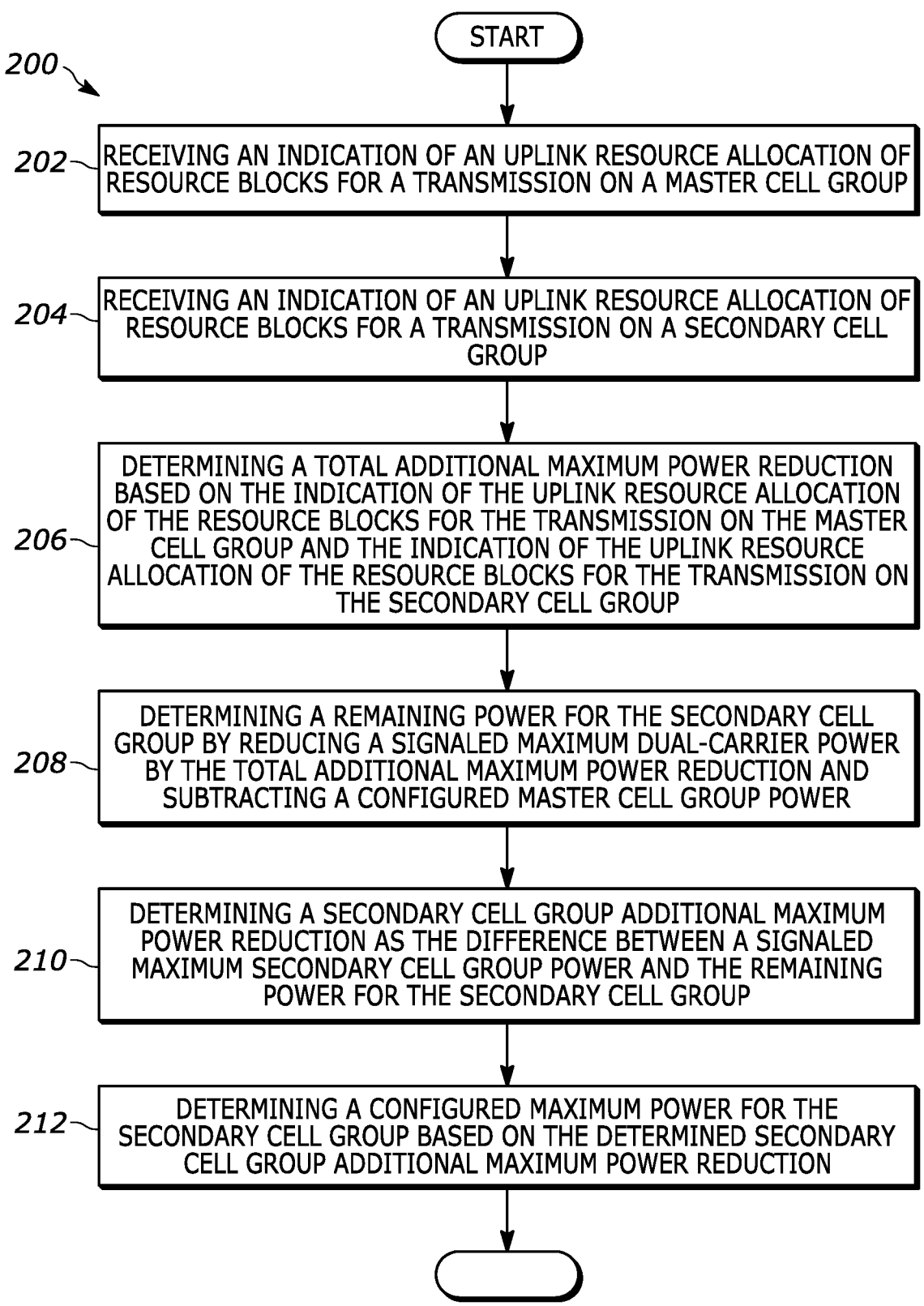
FIG. 2 is a flow diagram in a user equipment for determining secondary cell group additional maximum power reduction and configured maximum power.

FIG. 2 illustrates a flow diagram 200 of a method in a user equipment for determining secondary cell group additional maximum power reduction and configured maximum power. More specifically, the method includes receiving 202 an indication of an uplink resource allocation of resource blocks for a transmission on a master cell group. An indication is received 204 of an uplink resource allocation of resource blocks for a transmission on a secondary cell group. A total additional maximum power reduction is determined 206 based on the indication of the uplink resource allocation of the resource blocks for the transmission on the master cell group and the indication of the uplink resource allocation of the resource blocks for the transmission on the secondary cell group. A remaining power is determined 208 for the secondary cell group by reducing a signaled maximum dual-carrier power by the total additional maximum power reduction and subtracting a configured master cell group power. A secondary cell group additional maximum power reduction is determined 210 as the difference between a signaled maximum secondary cell group power and the remaining power for the secondary cell group. A configured maximum power is determined 212 for the secondary cell group based on the determined secondary cell group additional maximum power reduction.

In some instances, a secondary cell group transmission may be dropped if the determined remaining power for the secondary cell group is negative.

In some instances, the additional maximum power reduction for the secondary cell group may be defined to be infinite if the determined remaining power for the secondary cell group is negative.

In some instances, the configured maximum power for the secondary cell group may be used to determine a configured power for the secondary cell group. In some of these instances, a power spectral density for the secondary cell group is computed as a ratio of the configured power for the secondary cell group and a number of allocated resource blocks for the transmission on the secondary cell group. Further, a ratio of the power spectral density for the secondary cell group to a power spectral density for the master cell group may be compared to a threshold, and the transmission on the secondary cell group may be dropped if an absolute value of the ratio exceeds the threshold. Still further, a ratio of the power spectral density for the secondary cell group to a power spectral density for the master cell group may be compared to a threshold, and the transmission on the secondary cell group may be scaled until an absolute value of the ratio of the power spectral density for the secondary cell group to the power spectral density for the master cell group is equal to the threshold. Further yet, a threshold of a maximum ratio of the power spectral density for the secondary cell group to a power spectral density for the master cell group may be signaled to the user equipment.

In some instances, the transmission on the master cell group and the transmission on the secondary cell group may be intra-band.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 3:
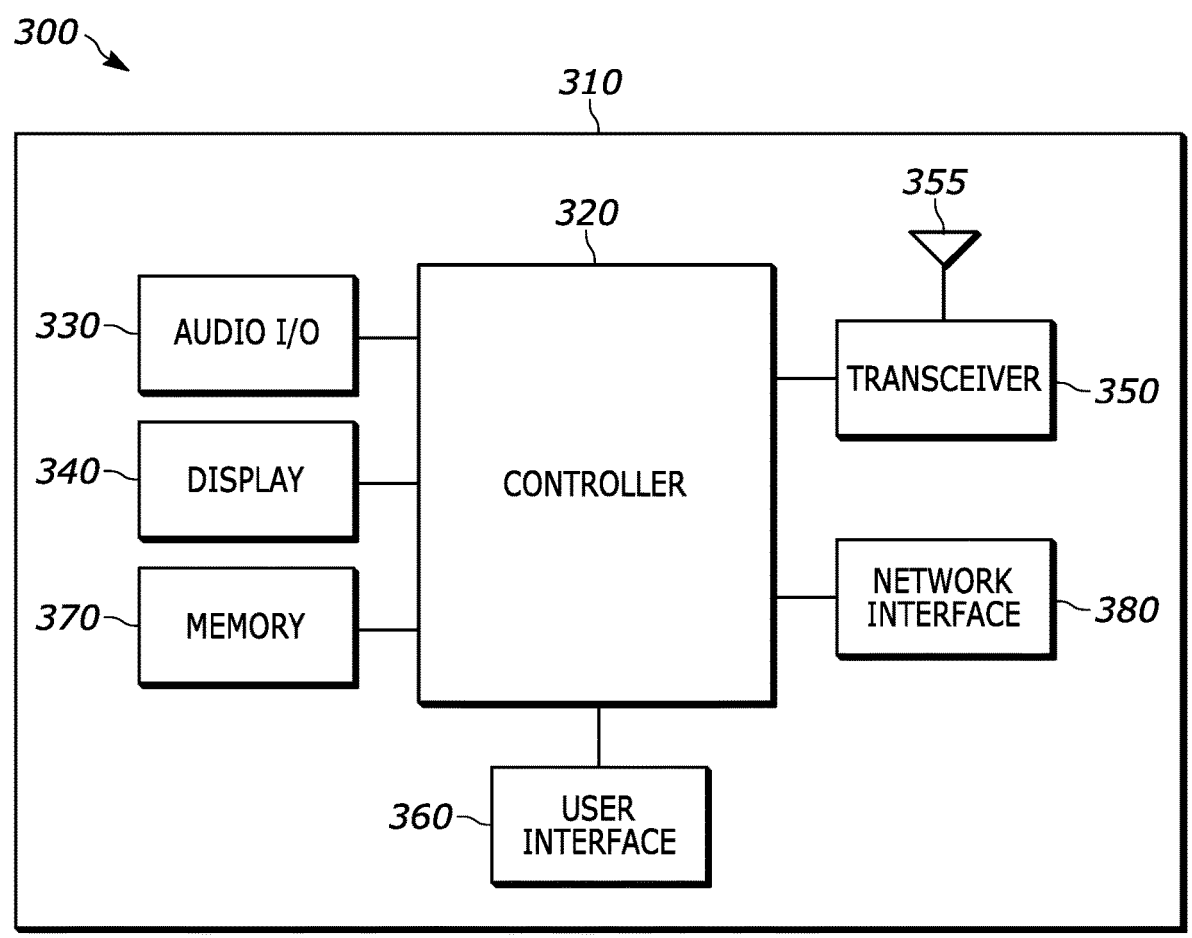
FIG. 3 is an example block diagram of an apparatus according to a possible embodiment.

FIG. 3 is an example block diagram of an apparatus 300, such as the wireless communication device 110, according to a possible embodiment. The apparatus 300 can include a housing 310, a controller 320 within the housing 310, audio input and output circuitry 330 coupled to the controller 320, a display 340 coupled to the controller 320, a transceiver 350 coupled to the controller 320, an antenna 355 coupled to the transceiver 350, a user interface 360 coupled to the controller 320, a memory 370 coupled to the controller 320, and a network interface 380 coupled to the controller 320. The apparatus 300 can perform the methods described in all the embodiments The display 340 can be a viewfinder, a liquid crystal display (LCD), a light emitting diode (LED) display, a plasma display, a projection display, a touch screen, or any other device that displays information. The transceiver 350 can include a transmitter and/or a receiver. The audio input and output circuitry 330 can include a microphone, a speaker, a transducer, or any other audio input and output circuitry. The user interface 360 can include a keypad, a keyboard, buttons, a touch pad, a joystick, a touch screen display, another additional display, or any other device useful for providing an interface between a user and an electronic device. The network interface 380 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 370 can include a random access memory, a read only memory, an optical memory, a solid state memory, a flash memory, a removable memory, a hard drive, a cache, or any other memory that can be coupled to an apparatus.

The apparatus 300 or the controller 320 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 370 or elsewhere on the apparatus 300. The apparatus 300 or the controller 320 may also use hardware to implement disclosed operations. For example, the controller 320 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 320 may be any controller or processor device or devices capable of operating an apparatus and implementing the disclosed embodiments. Some or all of the additional elements of the apparatus 300 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may is be used solely to distinguish one entity or action from another entity or action without necessarily requiring or implying any actual such relationship or order between such entities or actions. The phrase "at least one of," ""at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method comprising:
    receiving an indication of an uplink resource allocation of resource blocks for a transmission on a master cell group;
    receiving an indication of an uplink resource allocation of resource blocks for a transmission on a secondary cell group;
    determining a total additional maximum power reduction based on the indication of the uplink resource allocation of the resource blocks for the transmission on the master cell group and the indication of the uplink resource allocation of the resource blocks for the transmission on the secondary cell group;
    determining a remaining power for the secondary cell group by reducing a signaled maximum dual-carrier power by the total additional maximum power reduction and subtracting a configured master cell group power;
    determining a secondary cell group additional maximum power reduction as the difference between a signaled maximum secondary cell group power and the remaining power for the secondary cell group; and
    determining a configured maximum power for the secondary cell group based on the determined secondary cell group additional maximum power reduction.

2. The method of claim 1 wherein a secondary cell group transmission may be dropped if the determined remaining power for the secondary cell group is negative.

3. The method of claim 1 wherein the additional maximum power reduction for the secondary cell group is defined to be infinite if the determined remaining power for the secondary cell group is negative.

4. The method of claim 1 wherein the configured maximum power for the secondary cell group is used to determine a configured power for the secondary cell group.

5. The method of claim 4 wherein a power spectral density for the secondary cell group is computed as a ratio of the configured power for the secondary cell group and a number of allocated resource blocks for the transmission on the secondary cell group.

6. The method of claim 5 wherein a ratio of the power spectral density for the secondary cell group to a power spectral density for the master cell group is compared to a threshold, and the transmission on the secondary cell group is dropped if an absolute value of the ratio exceeds the threshold.

7. The method of claim 5 wherein a ratio of the power spectral density for the secondary cell group to a power spectral density for the master cell group is compared to a threshold, and the transmission on the secondary cell group is scaled until an absolute value of the ratio of the power spectral density for the secondary cell group to the power spectral density for the master cell group is equal to the threshold.

8. The method of claim 5 wherein a threshold of a maximum ratio of the power spectral density for the secondary cell group to a power spectral density for the master cell group is signaled to the user equipment.

9. The method of claim 1, wherein the transmission on the master cell group and the transmission on the secondary cell group are intra-band.

10. A user equipment in a communication network, the user equipment comprising:
    a transceiver that receives an indication of an uplink resource allocation of resource blocks for a transmission on a master cell group, and receives an indication of an uplink resource allocation of resource blocks for a transmission on a secondary cell group; and
    a controller, coupled to the transceiver, that determines a total additional maximum power reduction based on the indication of the uplink resource allocation of the resource blocks for the transmission on the master cell group and the indication of the uplink resource allocation of the resource blocks for the transmission on the secondary cell group;
    wherein the controller additionally determines a remaining power for the secondary cell group by reducing a signaled maximum dual-carrier power by the total additional maximum power reduction and subtracting a configured master cell group power;
    wherein the controller additionally determines a secondary cell group additional maximum power reduction as the difference between a signaled maximum secondary cell group power and the remaining power for the secondary cell group; and
    wherein the controller additionally determines a configured maximum power for the secondary cell group based on the determined secondary cell group additional maximum power reduction.

11. The user equipment of claim 10 wherein a secondary cell group transmission may be dropped if the determined remaining power for the secondary cell group is negative.

12. The user equipment of claim 10 wherein the additional maximum power reduction for the secondary cell group is defined to be infinite if the determined remaining power for the secondary cell group is negative.

13. The user equipment of claim 10 wherein the configured maximum power for the secondary cell group is used to determine a configured power for the secondary cell group.

14. The user equipment of claim 13 wherein a power spectral density for the secondary cell group is computed as a ratio of the configured power for the secondary cell group and a number of allocated resource blocks for the transmission on the secondary cell group.

15. The user equipment of claim 14 wherein a ratio of the power spectral density for the secondary cell group to a power spectral density for the master cell group is compared to a threshold, and the transmission on the secondary cell group is dropped if an absolute value of the ratio exceeds the threshold.

16. The user equipment of claim 14 wherein a ratio of the power spectral density for the secondary cell group to a power spectral density for the master cell group is compared to a threshold, and the transmission on the secondary cell group is scaled until an absolute value of the ratio of the power spectral density for the secondary cell group to the power spectral density for the master cell group is equal to the threshold.

17. The user equipment of claim 14 wherein a threshold of a maximum ratio of the power spectral density for the secondary cell group to a power spectral density for the master cell group is signaled to the user equipment.

18. The user equipment of claim 10, wherein the transmission on the master cell group and the transmission on the secondary cell group are intra-band.

\* \* \* \* \*